United States Patent [19]

Komatsu et al.

[11] Patent Number: 4,922,357

[45] Date of Patent: May 1, 1990

[54] MECHANISM FOR DRIVING THE REELS OF A TAPE PLAYER

[75] Inventors: Norimasa Komatsu; Asashi Miyazaki, both of Kakuda, Japan

[73] Assignee: Alps Electric Co., Ltd., Tokyo, Japan

[21] Appl. No.: 228,888

[22] Filed: Aug. 4, 1988

[30] Foreign Application Priority Data

Nov. 19, 1987 [JP] Japan .................................. 62-293821
Feb. 8, 1988 [JP] Japan .................................. 63-28354

[51] Int. Cl.⁵ ............................................. G11B 5/54
[52] U.S. Cl. .................................. 360/105; 242/200; 360/96.3
[58] Field of Search ................. 360/105, 96.1–96.4; 242/197–201, 206

[56] References Cited

U.S. PATENT DOCUMENTS 4,419,702 12/1983 Tanaka .................................. 360/105
4,442,466 4/1984 Isaki .................................... 360/105
4,674,001 6/1987 Takahashi et al. ................. 360/96.4
4,819,891 4/1989 Kamijo .............................. 360/96.4

Primary Examiner—David J. Severin
Attorney, Agent, or Firm—Guy W. Shoup; Norman R. Klivans

[57] ABSTRACT

A tape player which has a capstan rotatably driven by a motor and a driving gear rotated integrally with the capstan, a planetary gear circulating around the driving gear in response to the rotating direction of the driving gear, a pair of reel gears disposed at positions to be engaged with the planetary gear circulated in one direction of the driving gear and a pair of reel spools rotated by the reel gears, a mode switching gear disposed to be engaged with the planetary gear on the way of circulating trace, a switching cam rotated together with the mode switching gear, and a head base pressed by said switching cam. Thus, the tape player can set a review mode or a reverse play mode in a tape player simplified in a mechanism for driving the units by one electric motor.

5 Claims, 15 Drawing Sheets

MECHANISM FOR DRIVING THE REELS OF A TAPE PLAYER

BACKGROUND OF THE INVENTION

1. Field of the Invention

This invention relates to a tape player to be provided in an automatic answering telephone set in which a capstan, a pair of reel spools and a head base are driven by only one electric motor.

2. Description of the Prior Art

As mechanisms to be provided in a cassette driving unit for a tape player are needed power sources for driving a capstan, a pair of reel spools for driving a tape reel, and a head base for separably contacting a pinch roller for separably contacting a magnetic head with a tape with the capstan. In the conventional tape player, as power sources of minimum limit for fundamentally operating the player are included one electric motor for driving the capstan and a pair of reel spools, and a solenoid for driving the head base. A conventional example of a tape player of this type is disclosed in Japanese Utility Model Laid-open No. 174036/1986.

However, in the conventional tape layer having one motor and one solenoid is still insufficiently simplified in its mechanism and cost, is expensive to manufacture a simple tape player for use in an automatic answering telephone set.

SUMMARY OF THE INVENTION

Accordingly, an object of this invention is to provide a tape player which can eliminate the above-described drawbacks of the prior art and which can drive rotatably not only a capstan and a pair of reel spools but also a head base to simplify a mechanism to be manufactured inexpensively.

Another object of this invention is to provide a tape layer which can set a review mode or a reverse play mode in a tape player simplified in a mechanism for driving the units by one electric motor.

In order to achieve the above and other objects of the invention, there is provided according to one aspect of the present invention a tape player comprising a capstan rotatably driven by a motor and a driving gear rotated integrally with the capstan, a planetary gear circulating around the driving gear in response to the rotating direction of the driving gear always in engagement with the driving gear, a pair of reel gears disposed at positions to be engaged with the planetary gear circulated in one direction of the driving gear and at positions to be engaged with the planetary gear circulated in the reverse rotation of the driving gear and a pair of reel spools rotated by the reel gears, a mode switching gear disposed to be engaged with the planetary gear on the way of circulating trace moving from a position where the planetary gear is engaged with one of the reel gears to a position where the planetary gear is engaged with the other of the reel gears and partly formed with teeth to be rotated at a predetermined angle by the planetary gear, a switching cam rotated together with the mode switching gear, and a head base pressed by said switching cam while the mode switching gear is rotated by the planetary gear to be moved toward the reel spool and having a pinch roller opposed to the capstan.

In order to further achieve the above objects, there is provided according to another aspect of the present invention a tape player as set forth above, wherein said switching cam comprises a first switching cam disposed coaxially with the mode switching gear to press the head base while the mode switching gear is rotated by the planetary gear in one direction to contact the pinch roller under pressure with the capstan for setting a play mode, and a second switching cam formed with a smaller rotating radius than the first switching cam to press the head base while the mode switching gear is rotated reversely to the switching to the play mode by the planetary gear to lightly contact the magnetic head with the magnetic tape in the state that the pinch roller is separated from the capstan for setting a review mode.

In order to further achieve the above objects, there is provided according to still another aspect of the present invention a tape player as set forth above, wherein said switching cam comprises a first switching cam disposed coaxially with the mode switching gear to press the head base while the mode switching gear is rotated by the planetary gear in one direction to contact the pinch roller under pressure with the capstan for setting a play mode, and a second switching cam formed with the same rotating radius as the first switching cam to press the head base by the second switching cam while the mode switching gear is rotated reversely to the switching to the play mode by the planetary gear to press the pinch roller to the capstan and to contact the magnetic head with the magnetic tape for setting a reverse replay mode.

In order to further achieve the above objects, there is also provided according to still another aspect of the present invention a tape player as set forth above, wherein a stopper for restricting the rotation of the mode switching gear in engagement with the head base is provided at the mode switching gear when one direction driving of the mode switching gear is completed by the planetary gear, the first switching cam is completely pressed to the head base, and when the reverse driving of the mode switching gear by the planetary gear is completed and the second switching cam is completed to press the head base.

This tape player is provided to be switched in all modes merely by controlling the normal or revere rotation of the motor. More specifically, when the capstan and the driving gear are rotated by one motor, the planetary gear is circulated around the driving gear. The circulating planetary gear is engaged with a pair of reel gears to rotatably drive either one of the pair of reel gears. Further, when the planetary gear is circulated by the rotation of the motor in one direction, the planetary gear is engaged with the mode switching gear on the way of circulating trace, the head base is driven in response to the rotation of the mode switching gear, the magnetic head on the head base is moved to the position to be contacted with the tape, and the pinch roller is contacted with the capstan. When the mode switching gear completely drives the head base, the planetary gear passes the teeth cutout of the mode switching gear to be continuously circulated, engages the other reel to drive the reel spool to wind the tape thereon. When the motor is reversely rotated from this position and the planetary gear is reversely circulated, the planetary gear is engaged again with the mode switching gear on the way of the circulating trace, the head base is returned by the rotation of the mode switching gear, and the magnetic head and the pinch roller are separated from the tape and the capstan. Not only the reel spools but also the head base are driven merely by normally or reversely rotating the driving gear.

When the switching cam has the first switching cam and the second switching cam, the first switching cam presses the head base to drive it in response to the rotation of the mode switching gear by the rotation of the motor in one direction, the magnetic head on the head base is moved to the position to be contacted with the tape, and the pinch roller is contacted with the capstan for setting the play mode. When the mode switching gear completely drive the head base, the planetary gear passes the teeth cutout of the mode switching gear to be continuously circulated, the reel spool is driven in engagement with the other reel gear, and the tape is wound. When the motor is reversely rotated from this position and the planetary gear is reversely circulated, the mode switching gear is reversely rotatably driven in engagement with the mode switching gear on the way of the circulating trace. The first switching cam is removed out of the head base in the former half of the rotation of the mode switching gear, returned to the head base, and the magnetic head and the pinch roller are separated from the tape and the capstan. Further, in the rear half of the rotation of the mode switching gear, the second switching cam presses the head base. After this operation is completed, the planetary gear is separated from the mode switching gear to be engaged with the reel gear of the reverse side to the play mode, and the reel spool is driven together with the reel gear. At this time, when the second switching gear is smaller than the rotating radius of the first switching cam, the pinch roller is separated from the capstan at the advancing position of the head base but the magnetic head is lightly contacted with the magnetic tape. At this time the tape is rewound by the reel spool at a high speed for operating a review. When the rotating radius of the second switching cam is the same as that of the first rotating radius, the head base is pressed by the second switching cam. Then, the magnetic head is contacted with the magnetic tape, and the pinch roller is contacted under pressure with the capstan. At this time the tape is reversely wound to the play mode by the reel spool to switch to the reverse play mode.

Further, when the pressing of the head base is completed by the first switching cam, or when the pressing of the head base is completed by the second switching cam, the stopper provided at the mode switching gear is engaged with the head base. Then, the rotating position of the mode switching gear is locked, the planetary gear once separated from the mode switching gear is again returned to the original position. Then, the planetary gear can be positively engaged with the mode switching gear.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of a tape player according to the present invention will be described with reference to the accompanying drawings.

First Embodiment

Figure 1:
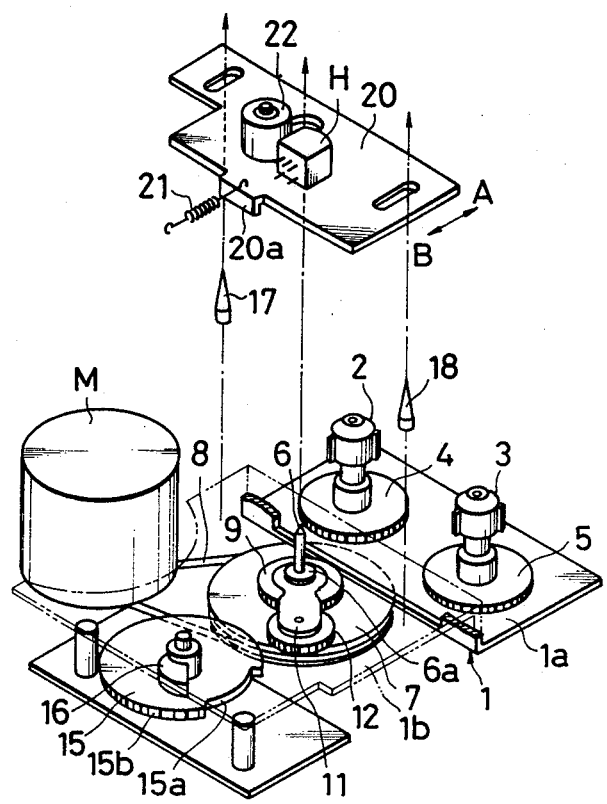
FIG. 1 is a perspective view showing an entire configuration of a tape player according to a first embodiment of this invention.

FIG. 1 is a perspective view showing a first embodiment of a tape player according to the present invention, and FIGS. 2 to 8 are plan views showing the switching operations to respective modes.

The tape player exemplified in this embodiment is charged with a cassette of so-called "microsize".

Construction of Tape Player

In FIG. 1, reference numeral 1 denotes a chassis made by punching and pressing. The chassis 1 is bent at the sides in a crank shape in a 2-stage structure of a lower mounting surface 1a and an upper mounting surface 1b. On the lower mounting surface 1a are rotatably supported a takeup reel spool 2 and a supply reel spool 3 in a manner perpendicular at their axes to the lower mounting surface 1a. A reel gear 4 is provided at the base of the reel spool 2, and a reel gear 5 is provided at the base of the reel spool 3 in parallel with the lower mounting surface 1a. Slipping mechanisms are respectively provided between the reel gear 4 and the reel spool 2, and between the reel gear 5 and the reel spool 3. When a tape tension is applied to the reel spool 2 or 3, the reel spools 2 and 3 slip with respect to the reel gears 4 and 5, respectively, to absorb the difference between the tape winding speed and the rotating speed of the reel gear.

Figure 2:
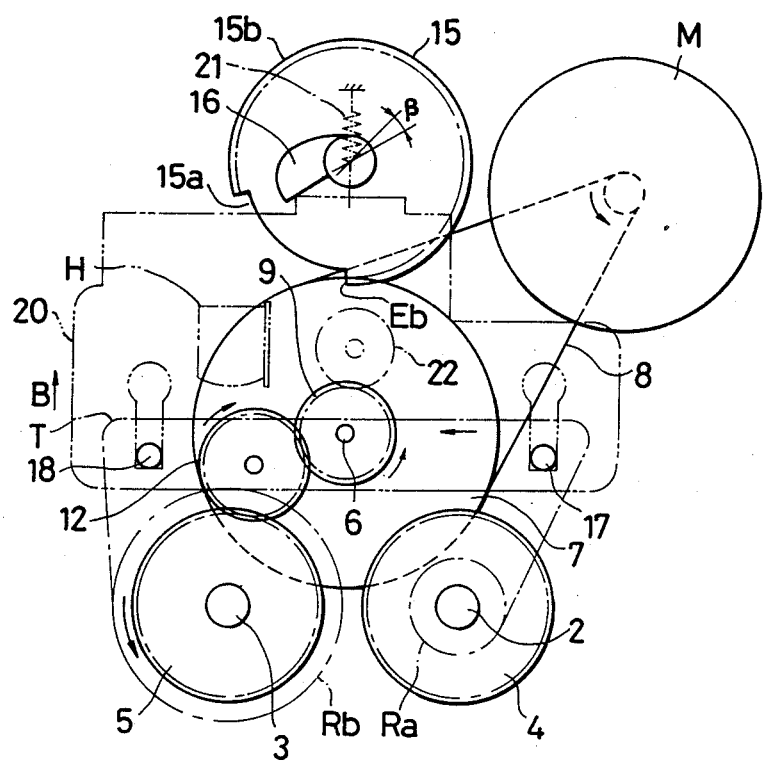
FIG. 2 is a plan view showing a REW mode of a driving mechanism.

A bearing by a housing 6a is provided on the upper mounting surface 1b of the chassis 1 to rotatably support a capstan 6. A flywheel 7 integrated with the capstan 6 is provided underneath the upper mounting surface 1b. An electric motor M is provided at the side of the chassis. A belt 8 is engaged between the driving pulley of the motor M and the flywheel 7 to rotatably drive the capstan 6 together with the flywheel 7 by the motor M. A driving gear 9 rotating together with the capstan 6 is provided on the upper surface of the flywheel 7. An idle arm 11 is supported to the housing 6a provided on the upper mounting surface 1b of the chassis 1, and a planetary gear 12 which is always engaged with the driving gear 9 is provided at the end of the idle arm 11. A light rotary load is applied by a spring or the like between a shaft provided at the idle arm 11 and the planetary gear 12 rotatably supported to the shaft. When the capstan 6 and the driving gear 9 are rotated in either direction due to the presence of the load, the idle arm 11 follows up the rotating direction. Thus, the planetary gear 12 rotates around the driving gear 9. When the driving gear 9 is rotated clockwise in FIG. 1, the planetary gear 12 rotating around the driving gear 9 arrives at the position to be engaged with the takeup reel gear 4 (FIG. 5), while when the driving gear 9 is rotated counterclockwise in FIG. 1, the planetary gear 9 arrives at the position to be engaged with the supply reel gear 5 (FIG. 2).

A mode switching gear 15 is provided under the upper mounting surface 1b of the chassis 1. The mode switching gear 15 is so disposed at the position where the planetary gear 12 is engaged with the mode switching gear 15 on the way of circulating trace from the position to be engaged with one reel gear 4 to the position to be engaged with the other reel gear 5. A teeth cutout 15a is formed partly on the periphery of the mode switching gear 15 in a structure that teeth 15b are partly formed on the remaining periphery of the mode switching gear 15. When the teeth 15b of the mode switching gear 15 is opposed to the planetary gear 12 rotating around the driving gear 9, the rotary force of the planetary gear 12 is transmitted through the teeth 15b to the mode switching gear 15, while when the teeth cutout 15a of the mode switching gear 15 is opposed to the planetary gear 12, the planetary gear 12 passes the teeth cutout 15a of the mode switching gear 15 so that the planetary gear 12 does not drive the mode switching gear 15 but moves on the circulating trace.

A switching cam 16 is so formed on the upper surface of the mode switching gear 15 as to integrally rotate with the mode switching gear 15.

A head base 20 is provided on the upper surface of the upper mounting surface 1b of the chassis 1. The head base 20 is guided by positioning pins 17, 18 provided on the upper mounting surface 1b of the chassis 1 to be slidable in a direction A-B. A spring 21 is interposed between the rear end of the head base 20 and the chassis 1 to urge the head base 20 in a direction B. A bent piece 20a is bent at the rear end of the head base 20 to extend to the position opposed to the switching cam 16. A pinch roller 22 opposed to a magnetic head H and the capstan 6 is supported onto the head base 20.

The operation of the tape player constructed as described above will be sequentially described with reference to FIGS. 2 to 8.

A cassette (not shown) of so-called microsize is so charged as to be positioned by the positioning pins 17 and 18. Tape reels in the cassette are respectively mounted on the reel spools 2 and 3.

REW Mode

FIG. 2 shows a tape rewinding mode (REW mode). In this REW mode, the mode switching gear 15 is disposed in a direction as shown in FIG. 2, and the switching cam 16 is directed obliquely to the leftward in FIG. 2. The head base 20 is returned in the direction B by the tension of the spring 21, the pinch roller 22 on the head base 20 is separated from the capstan 6, and the magnetic head H is moved backward to the position separated from the tape T in the cassette half. When the motor M is driven counterclockwise in FIG. 2 in this state, the flywheel 7, the driving gear 9 and the capstan 6 are driven counterclockwise in FIG. 2. The planetary gear 12 follows up the counterclockwise rotation of the driving gear 9 to rotate counterclockwise around the driving gear 9, and the planetary gear 12 is engaged with the supply reel gear 5. The rotary force of the motor M is transmitted by the driving gear 9 through the planetary gear 12 to the reel gear 5 to rotate counterclockwise the supply reel spool 3 together with the reel gear 5. The supply tape reel Rb in the cassette is thus rotated counterclockwise to rewind the tape. The rotating speed of the motor M at this time is high to rewind the tape T at a high speed.

Switching to Play Mode

Figure 3:
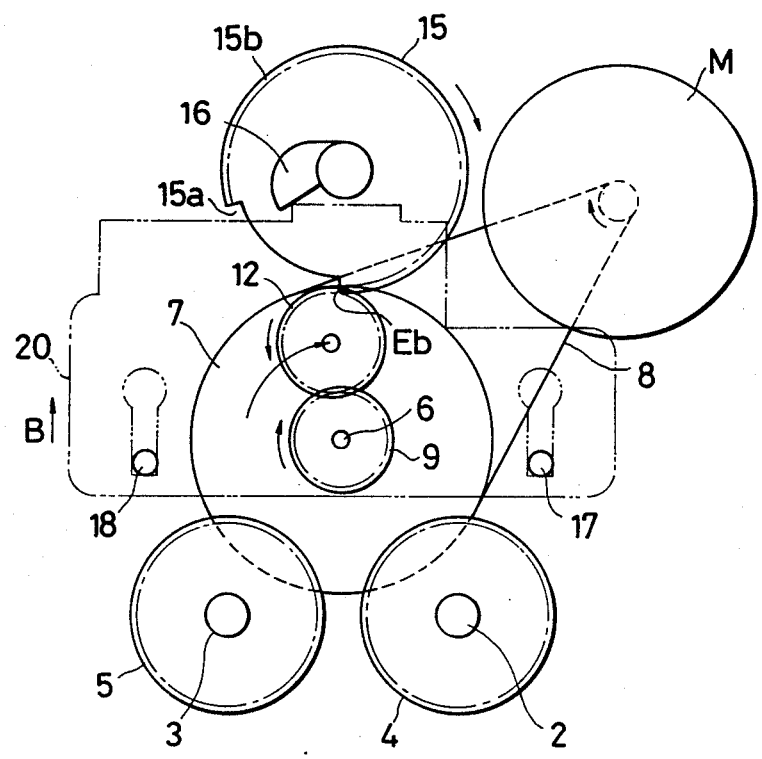
FIGS. 3 and 4 are views showing the switching from REW mode to a play mode.
Figure 4:
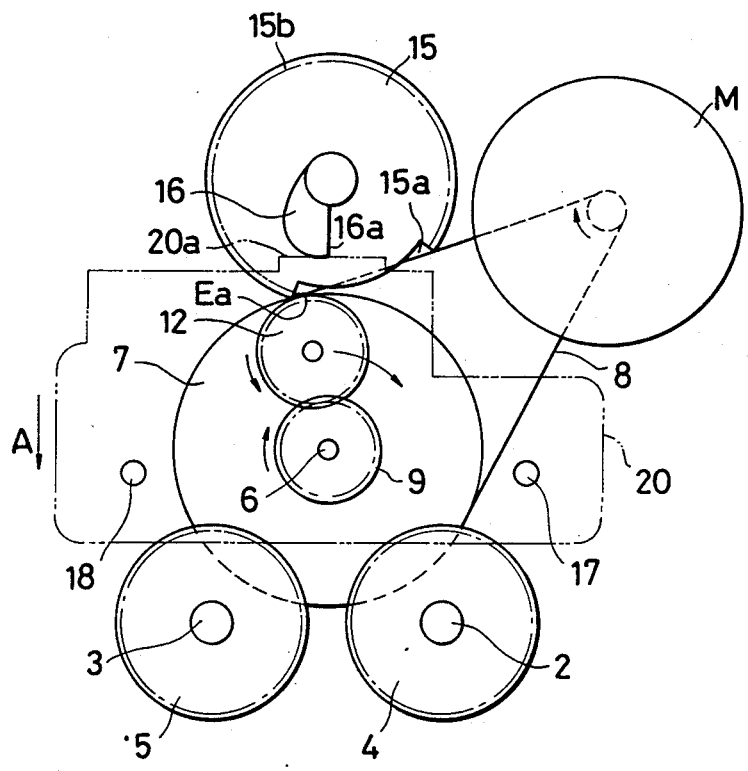
Figure 5:
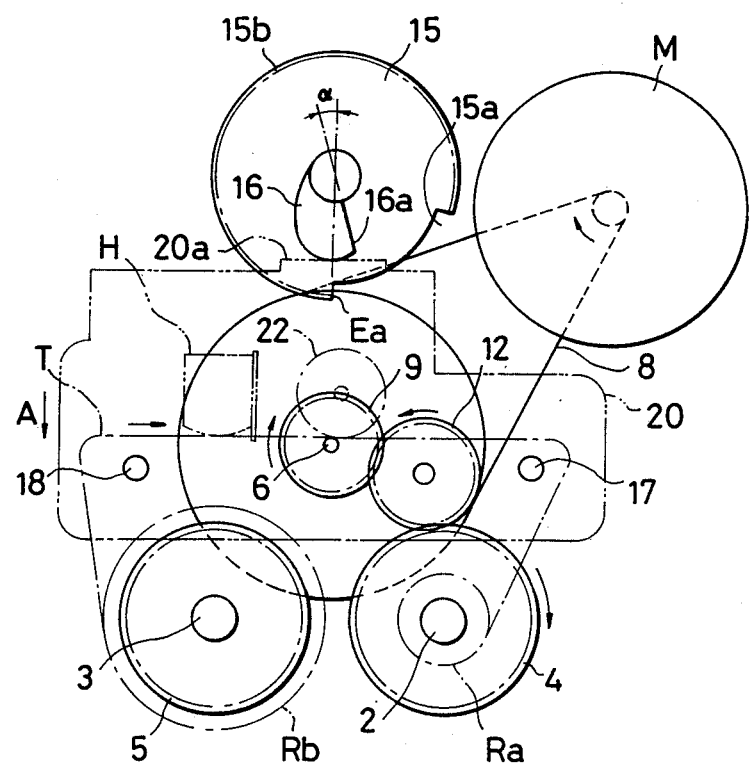
FIG. 5 is a view showing the play mode.

When the tape player is switched from the REW mode in FIG. 2 to recording or reproducing mode (play mode), the motor M is driven clockwise as shown in FIG. 3. When the driving gear 9 is driven clockwise by the motor M, the planetary gear 12 is circulated clockwise by following up the clockwise rotation of the driving gear 9 to separate from the reel gear 5, thereby engaging at the edge Eb of the teeth cutout 15a of the mode switching gear 15 with the teeth 15b of the gear 15. The power of the motor M is transmitted at this position through the driving gear 9, the planetary gear 12 to the mode switching gear 15 to rotate the mode switching gear 15 clockwise in FIG. 3. While the mode switching gear 15 is being driven, the planetary gear 12 retains at this position. When the mode switching gear 15 is rotated to the position shown in FIG. 4, the teeth cutout 15a of the mode switching gear 15 is moved to the position of the planetary gear 12, and the planetary gear 12 can be separated from the edge Ea of the teeth 15b of the mode switching gear 15. The planetary gear 12 separated from the edge Ea is circulated around the driving gear 9 as it is. Thus, as shown in FIG. 5 (play mode), the planetary gear 12 is moved to the position to be engaged with the takeup reel gear 4. During the period from the state in FIG. 3 to the state in FIG. 4, the switching cam 15 is rotated clockwise together with the driving gear 15 rotated clockwise, the switching cam 16 is contacted with the bent piece 20a of the head base 20, and the head base 20 is pressed in a direction A against the tension of the spring 21. At the time in FIG. 4, the planetary gear 12 is separated from the edge Ea of the teeth 15b. In this case, the distal end 16a of the switching cam 16 is contacted with the bent piece 20a. After the planetary gear 12 is separated from the edge Ea of the teeth 15b, the head base 20 is slightly returned in the direction B by the shape of the switching cam 16 and the recoiling strength of the spring 21 in a direction B of the head base 20. In the play mode in FIG. 5, the mode switching gear 15 is stopped in the state rotated counterclockwise at an angle $\alpha$ from the state as shown in FIG. 4. In this manner, the edge Ea of the teeth 15b is moved counterclockwise from when the planetary gear 12 is separated, and when the planetary gear 12 is rotated counterclockwise in the later mode switching operation, the planetary gear 12 is positively engaged with the edge Ea of the teeth 15b of the mode switching gear 15.

In the play mode of FIG. 5, since the head base 20 is moved forward in a direction A, the magnetic head H provided on the head base 20 is contacted with the tape T in the cassette. Further, the pinch roller 22 presses the tape T to the capstan 6. Since the motor M is continuously rotated clockwisely, the capstan 6 is accordingly rotated clockwise, and the tape T interposed to the pinch roller 2 is fed rightward in FIG. 5 at a predetermined constant speed in response to the rotating speed of the capstan 6. The power of the motor M is transmitted through the driving gear 9, the planetary gear 12 to the reel gear 4 to drive the takeup reel spool 2 clockwise. The takeup tape reel Ra in the cassette is thus driven clockwise, to take up the tape. The difference between the rotating speed of the tape and the tape feeding speed fed by the capstan 6 is absorbed by the slipping mechanism provided between the reel gear 4 and the reel spool 2.

As described above, the tape T fed by the capstan 6 is recorded or reproduced by the magnetic head H.

Stop of Play Mode

Figure 6:
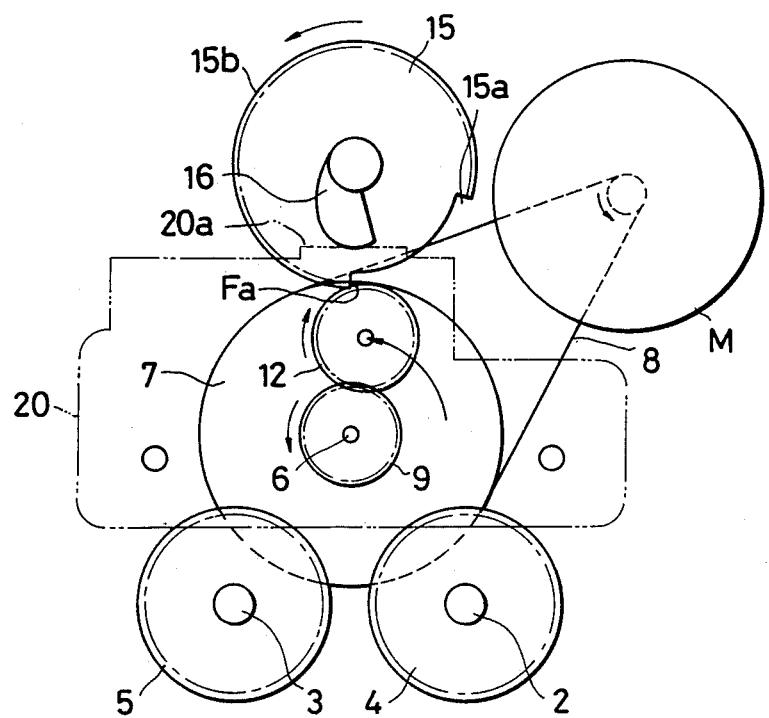
FIG. 6 is a view showing the switching from the play mode to the stop mode, REW mode or FF mode.

When the play mode shown in FIG. 5 is stopped, i.e. when the play mode is switched to the stop mode, the REW mode or tape fast forward feeding mode (FF mode), the rotating direction of the motor M is switched from the play mode to the counterclockwise direction. When the driving gear 9 is driven counterclockwise by the motor M, the planetary gear 12 starts rotating along the rotating direction of the driving gear 9, and separating from the reel gear 4 to interrupt the power to the takeup reel spool 2. The planetary gear 12 is further rotated counterclockwise to arrive at the position to be engaged with the edge Ea of the teeth 15b of the mode switching gear 15 as shown in FIG. 6. Since the edge Ea of the teeth 15B is moved to the position to be easily engaged with the planetary gear 12 by the rotation of the mode switching gear 15 at an angle α as shown in FIG. 5, the planetary gear 12 rotated counterclockwise is positively engaged with the teeth 15b of the mode switching gear 15. When the planetary gear 12 is engaged with the teeth 15b of the mode switching gear 15 as shown in FIG. 6, the power of the motor M is thereafter transmitted by the driving gear 9 through the planetary gear 12 to the mode switching gear 15, and the mode switching gear 15 is driven counterclockwise. When the mode switching gear 15 is then rotated to the angle of FIG. 7, the pressing force of the switching cam 16 to the bent piece 20a is released, the head base 20 is returned in the direction B by the tension of the spring 21, the magnetic head H is moved backward to the position not contacted with the tape T, and the pinch roller 22 is separated from the capstan 6. A detector for the rotating angle of the mode switching gear 15 is provided to stop the motor M when arriving at the position as shown in FIG. 7, thereby becoming the stop mode.

Switching to FF Mode

Figure 7:
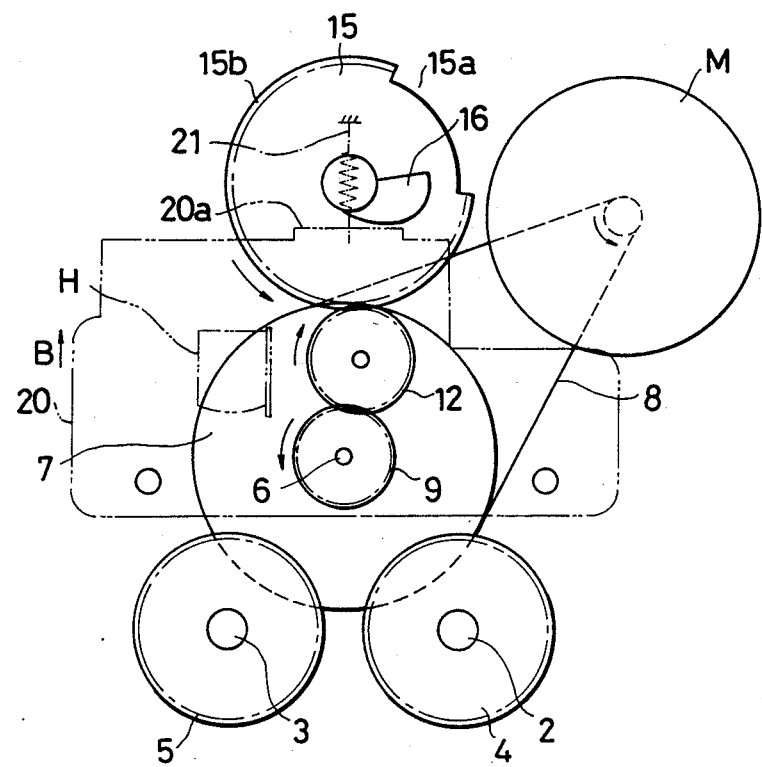
FIG. 7 is a view showing a stop mode.

When the tape player is switched to the tape fast forward feeding mode (FF mode), the motor M is reversely rotated clockwise from the state shown in FIG. 7. The planetary gear 12 is rotated clockwise around the driving gear 9 by the clockwise rotation of the driving gear 9, and separated from the mode switching gear 15 to become the state to be engaged with the reel gear 4. Since the head base 20 remains moved backward in the direction B as shown in FIG. 7 at this time, the magnetic head H and the pinch roller 22 are moved backward to the position separated from the tape T. The reel gear 14 is driven clockwise by the planetary gear 12 in this state, and the tape is taken up by the reel spool 2. The motor M is rotated at a high speed at this time, and the tape T is fed at a high speed. When the tape player is switched from the stop mode to the FF mode, the motor M may be rotated clockwise from the state as shown in FIG. 7. When the tape player is switched from the REW mode as shown in FIG. 2 to the FF mode, the player is once switched from the state as shown in FIG. 2 to the play mode as shown in FIGS. 2 to 5, and immediately fed in the route from FIG. 6 to FIG. 7, and then switched to the FF mode.

Switching to REW Mode

Figure 8:
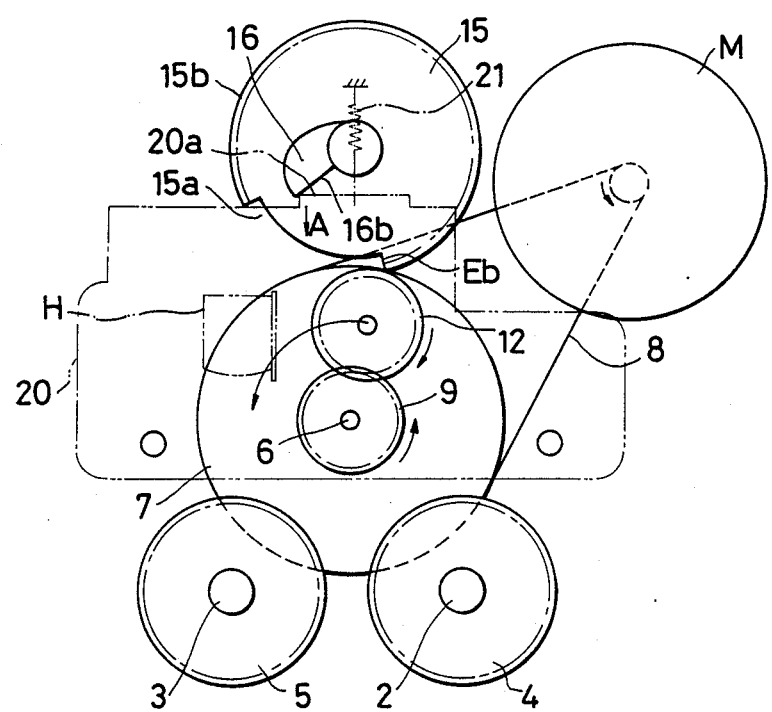
FIG. 8 is a view showing the switching from the play mode or FF mode to REW mode.

Then, when the tape player is switched from the play mode in FIG. 5 to the REW mode in FIG. 2, or when the player is switched from the FF mode to the REW mode, the motor M is driven counterclockwise to the state as shown in FIG. 7. The motor M is further driven counterclockwise from the state as shown in FIG. 7. This power of the motor M is transmitted from the driving gear 9 through the planetary gear 12 to the mode switching gear 15, and the mode switching gear 15 is driven counterclockwise. When the mode switching gear 15 is then rotated to the position as shown in FIG. 8, the planetary gear 12 is disengaged from the edge Eb of the teeth 15b of the mode switching gear 15, the planetary gear 12 passes the teeth cutout 15a of the mode switching gear 15 through the circulating trace counterclockwise, and moved to the position to be engaged with the supply reel gear 5 as shown in FIG. 2. As described above, the power is transmitted from the planetary gear 12 to the reel gear 5, and the tape is rewound by the reel spool 3.

In the step of switching to the REW mode, the edge 16b of the switching cam 16 once presses the bent piece 20a of the head base 20 in the direction B, immediately after the planetary gear 12 is disengaged from the edge Eb of the teeth 15b of the mode switching gear 15 as shown in FIG. 8. Accordingly, the head base 20 is slightly returned by the tension of the spring 21 immediately after the planetary gear 12 is separated from the mode switching gear 15, and the mode switching gear 15 is returned clockwise at an angle β as shown in FIG. 2. In this manner, the mode switching gear 15 is returned at the angle β, the edge Eb of the teeth 15b is moved clockwise from the position as shown in FIG. 8. This is provided to easily engage the planetary gear 12 with the teeth 15b of the mode switching gear 15 when the planetary gear 12 is moved clockwise along the circulating trace in the case where the player is switched from the REW mode to the play mode.

Second Embodiment

Figure 9:
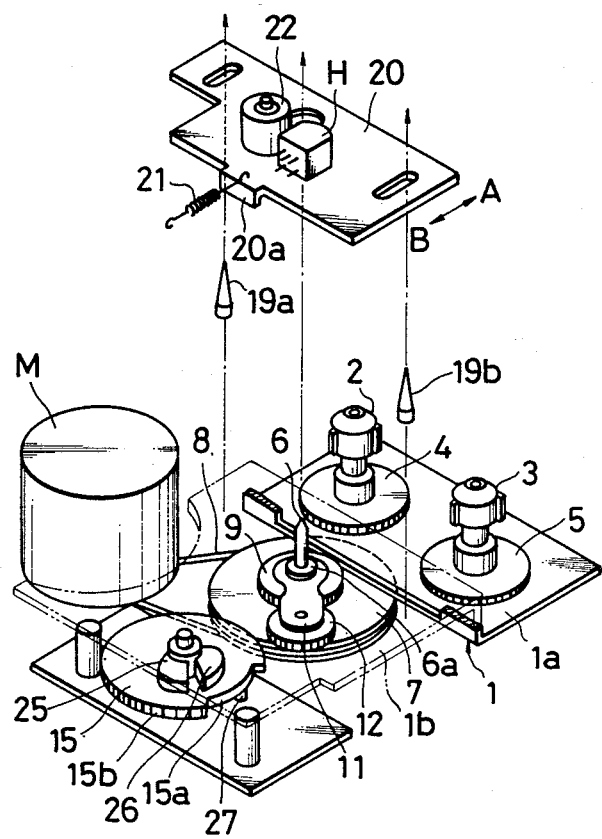
FIG. 9 is a perspective view showing the entire structure of a tape player according to a second embodiment

FIG. 9 is a perspective view showing a second embodiment of a tape player according to the present invention, and FIGS. 10 to 15 are plan views showing the switching operations to respective modes in the tape player of the second embodiment.

The second embodiment is different from the first embodiment at a switching cam.

Construction of Tape Player

Figure 10:
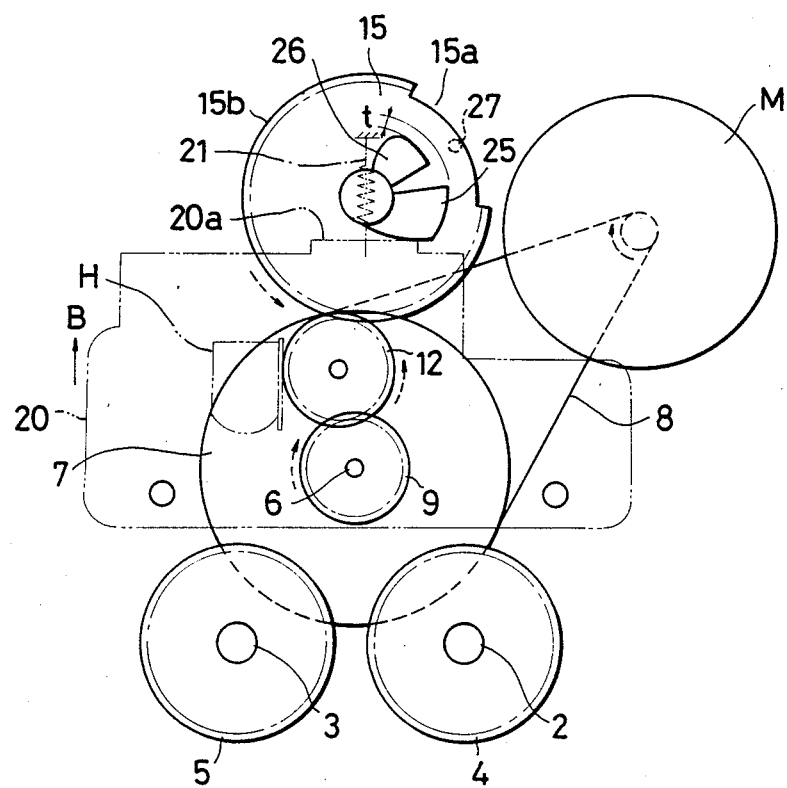
FIG. 10 is plan view showing a stop mode

A first switching cam 25 and a second switching cam 26 are provided instead of the switching cam 16 in FIG. 1 on the upper surface of the mode switching gear 15. As shown in FIG. 10, the radius of the second switching cam 26 is slightly smaller by a small size t than that of the first switching cam 25. Further, a stopper 27 is projected from the lower surface of the edge of the teeth cutout 15a of the mode switching gear 15 toward the rear surface. The positional relationship among the stopper 27, the switching cams 25 and 26 is as shown in FIG. 10.

The operation of the tape player constructed as described above will be sequentially described with reference to FIGS. 10 to 15.

Stop Mode

FIG. 10 shows a stop mode. The first switching cam 25 and the second switching cam 26 on the mode switching gear 15 are removed from the bent piece 20a of the head base 20 at this time, and the head base 20 is drawn in the direction B by the tension of the spring 21. When the head base 20 is disposed at this position, the magnetic head H is separated from the magnetic tape in the cassette, and the pinch roller 22 is separated from the capstan 6.

Switching from Stop Mode to Play Mode

Figure 11:
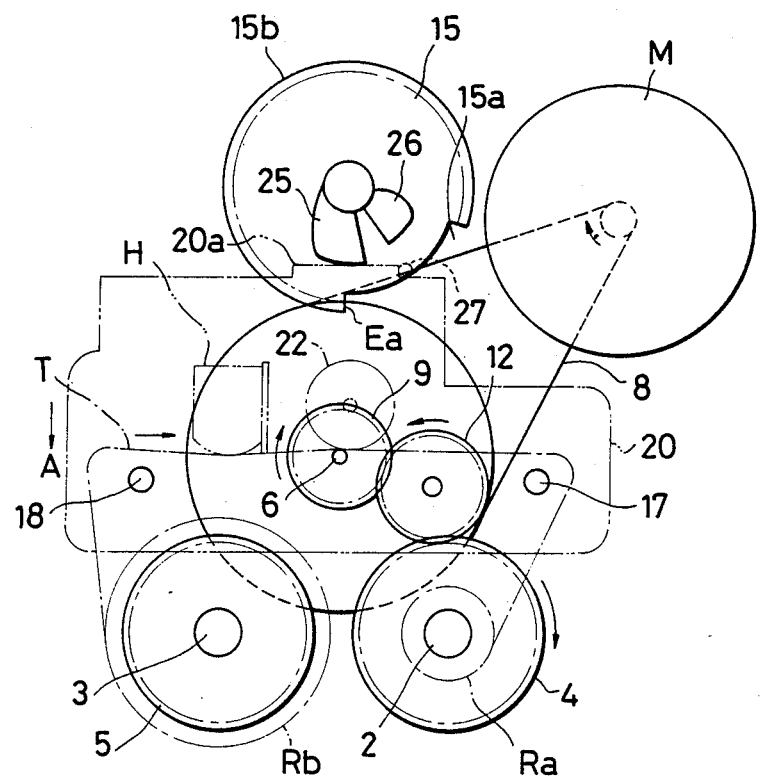
FIG. 11 is a view showing a play mode.

When the tape player is switched from the stop mode in FIG. 10 to recording or reproducing mode (play mode), the motor M is driven clockwise in the state in FIG. 10 (as shown by an arrow with a broken line in FIG. 10). When the driving gear 9 is driven clockwise by the motor M, the planetary gear 12 follows up this clockwise rotation of the driving gear 9 to be affected by the force for circulating clockwise to be positively engaged with the teeth 15b of the mode switching gear 15. The power of the motor M is transmitted through the driving gear 9 and the planetary gear 12 to the mode switching gear 15, and the mode switching gear 15 is driven clockwise. While the mode switching gear 15 is being driven, the planetary gear 15 retains at this position. When the mode switching gear 15 is rotated to the position as shown in FIG. 11, the teeth cutout 15a of the mode switching gear 15 is moved to the position of the planetary gear 12 so that the planetary gear 12 can be separated from the edge Ea of the teeth 15b of the mode switching gear 15. The planetary gear 12 separated from the edge Ea is circulated clockwise around the driving gear 9 as it is, and arrived at the position to be engaged with the takeup reel gear 4 of the planetary gear 12 as shown in FIG. 11 (play mode). During the period from the state in FIG. 10 to the state in FIG. 11, the first switching cam 25 is rotated clockwise together with the driving gear 9 rotating clockwise, the first switching cam 25 is contacted with the bent piece 20 of the head base 20, and the head base 20 is pushed in the direction A against the tension of the spring 21. The planetary gear 12 is separated from the edge Ea of the teeth 15b on the way of the switching operation. At this time, the stopper 27 provided at the mode switching gear 15 is contacted with the right edge of the bent piece 20a of the head base 20. Accordingly, in the play mode in FIG. 11, the mode switching gear 15 cannot be further rotated clockwise, and the edge Ea of the teeth 15b does not move clockwise. Therefore, when the planetary gear 12 is circulated counterclockwise in the later mode switching operation, the planetary gear 12 is positively engaged with the edge Ea of the teeth 15b. Further, the stopper 27 is engaged with the edge of the bent piece 20a, and the head base 20 can be positioned.

In the play mode in FIG. 10, the head base 20 is moved forward in the direction A. Thus, the magnetic head H provided on the head base 20 is contacted with the tape T in the cassette half. Further, the pinch roller 22 presses the tape T to the capstan T. Since the motor M is continuously rotated clockwise, the capstan 6 is similarly rotated clockwise, and the tape T interposed to the pinch roller 22 is fed rightward in FIG. 10 at a predetermined constant speed in response to the rotating speed of the capstan 6. The power of the motor M is transmitted through the driving gear 9 and the planetary gear 12 to the reel gear 4, and the takeup reel spool 2 is driven clockwise. The takeup tape reel Ra in the cassette is driven clockwise, and the tape is wound. The difference between the rotating speed of the reel spool 2 and the tape feeding speed fed by the capstan 6 is absorbed by the slipping mechanism provided between the reel gear 5 and the reel base 2.

In this manner, the tape T fed rightward in FIG. 10 by the capstan 6 is recorded or reproduced by the magnetic had H. The magnetic head H uses, for example, a recording/reproducing head and an erasure head integrated. Both the heads may be provided in the same case, or both may be bonded.

Stop of Play Mode

Figure 12:
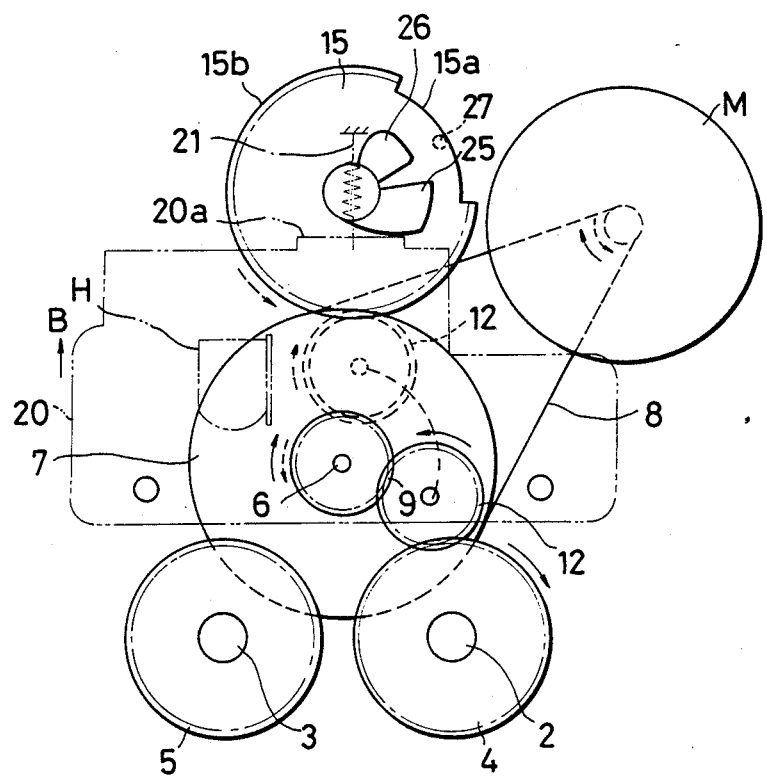
FIG. 12 is a view showing an FF mode.

When the play mode shown in FIG. 11 is stopped, the rotating direction of the motor M is switched to the counterclockwise direction. When the driving gear 9 is driven counterclockwise by the motor M, the planetary gear 12 starts rotating along the rotating direction of the driving gear 9, and separating from the reel gear 4 to interrupt the power to the takeup reel spool 2. The planetary gear 12 is further rotated counterclockwise to arrive at the position to be engaged with the edge Ea of the teeth 15b of the mode switching gear 15. When the planetary gear 12 is engaged with the teeth 15b of the mode switching gear 15, the power of the motor M is thereafter transmitted by the driving gear 9 through the planetary gear 12 to the mode switching gear 15, and the mode switching gear 15 is driven counterclockwise. The position of the planetary gear 12 at this time is shown by a broken line in FIG. 12. The rotating directions of the gears at this time are as designated by arrows with broken lines in FIG. 12. When the mode switching gear 15 is rotated to the angle as shown in FIG. 12, the pressing of the first switching cam 25 to the bent piece 20a is released, the head base 20 is returned by the tension of the spring 21 in the direction B, the magnetic head H is moved backward to the position where the magnetic head H is not contacted with the tape T, and the pinch roller 22 is separated from the capstan 6. A detector for the rotating angle of the mode switching gear 15 is provided to stop the motor M when it is arrived at the position in FIG. 12, thereby becoming the stop mode.

Switching to FF Mode

When the tape player is switched to the tape fast forward feeding mode (FF mode), the motor M is reversely rotated clockwise from the state shown in FIG. 12 (The rotating direction at this time is designated by an arrow with solid line in FIG. 12). The planetary gear 12 is rotated clockwise around the driving gear 9 by the clockwise rotation of the driving gear 9, and separated from the mode switching gear 15 to become the state to be engaged with the reel gear 4. Since the head base 20 remains moved backward in the direction B as shown in FIG. 12 at this time, the magnetic head H and the pinch roller 22 are moved backward to the position separated from the tape T. The reel gear 14 is driven clockwise by the planetary gear 12 in this state, and the tape is taken up by the reel spool 2. The motor M is rotated at a high speed at this time, and the tape T is fed at a high speed.

Switching to Review Mode

The review mode is defined in this specification in the state that the tape is rewound at a high speed and the magnetic head H is lightly contacted with the tape T. In this review mode, the recording content can be controlled to be lead.

Figure 13:
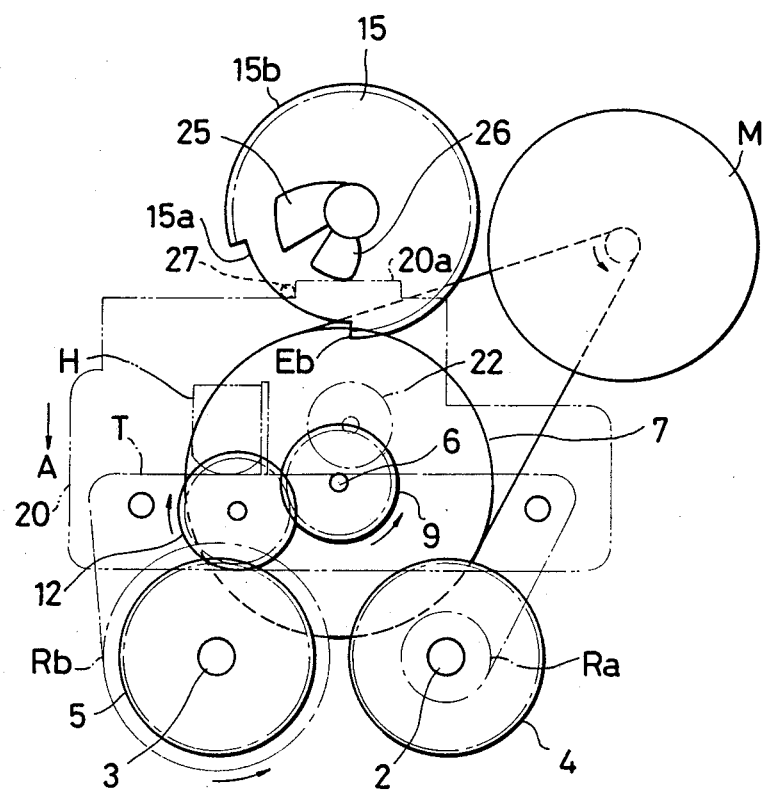
FIG. 13 is a view showing a review mode.

The tape player is switched to the review mode from the FF mode as designated by a solid line in FIG. 12 or the stop mode where the planetary gear 12 is disposed at a position as designated by a broken line. When the motor M is driven at the position as shown in FIG. 4 counterclockwise, the driving gear 9 is driven counterclockwise. Thus, the planetary gear 12 is effected by a force to be circulated counterclockwise, and the planetary gear 12 is engaged with the teeth 15b of the mode switching gear 15 by this force. When the motor M is continuously rotated counterclockwise as it is, the planetary gear 12 is continuously rotated at the position designated by a dotted chain line in FIG. 4, and the mode switching gear 15 is driven counterclockwise. When the mode switching gear 15 is rotated to the angle as shown in FIG. 13, the teeth cutout 15a of the mode switching gear 15 is moved to the position of the planetary gear 12, the planetary gear 12 is removed from the edge Eb of the teeth 15b, and the planetary gear 12 is circulated counterclockwise around the driving gear 9 as it is to be engaged with the reel gear 5 of the left side in FIG. 13. As shown in FIG. 13, when the planetary gear 12 is separated from the teeth 15b of the mode switching gear 15, the stopper 27 provided at the mode switching gear 15 is engaged with the left edge of the bent piece 20a of the head base 20. Therefore, the mode switching gear 15 cannot be further rotated counterclockwise, and the edge Eb of the teeth 15b is restricted to move any further counterclockwise. Accordingly, when the planetary gear 12 is circulated clockwise in the later switching operation, the planetary gear 12 can be positively engaged with the edge Eb of the teeth 15b. Thus, the head base 20 is positioned by the stopper 27. During the period that the player is switched to the state as shown in FIG. 13, the second switching cam 26 provided on the mode switching gear 15 presses the bent piece 20a of the head base 20 to move the head base 20 in the direction A. However, the rotating radius of the second switching cam 26 is formed to be smaller by t than that of the first switching cam 25 used to switch to the play mode (FIG. 10), the moving distance of the head base 20 in the direction A in FIG. 13 is slightly shorter than the moving distance of the head base 20 in case of the play mode shown in FIG. 11. Accordingly, when the head base 20 is moved in the direction A, the pinch roller 22 is separated from the capstan 6 so that the rotary force of the capstan 6 is not transmitted to the tape T. Further, the magnetic head H is lightly contacted with the tape T (the magnetic head H is so contacted in the degree that the tape T is deflected in the play mode shown in FIG. 11). When the motor M is driven counterclockwise in the state as shown in FIG. 13, the reel gear 5 is driven counterclockwise through the planetary gear 12, the tape reel Rb is driven by the supply reel spool 3 to rewind the tape T. The rotating speed of the motor M at this time is switched to a high speed. While the tape T is rewound at the high speed in this manner, the record signal of the tape T is read by the magnetic head H, thereby leading the content of the tape.

Switching to REW

Figure 14:
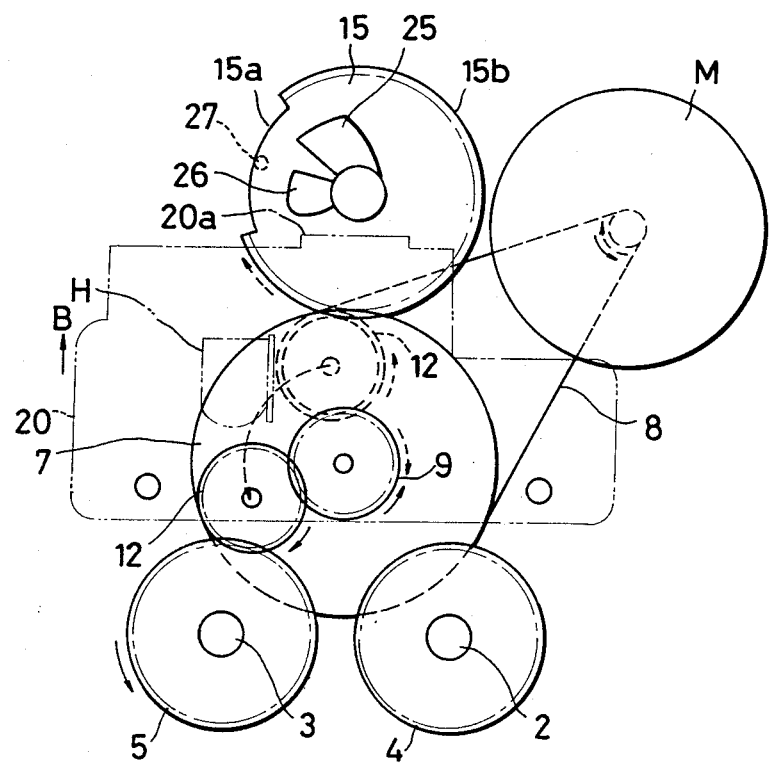
FIG. 14 is a view showing a REW mode.

When switched to the REW mode, the motor M is rotated clockwise from the state of the review mode shown in FIG. 13. The driving gear 9 is rotated clockwise, the planetary gear 12 is circulated clockwise, and the planetary gear is circulated clockwise so that the planetary gear 12 is engaged with the teeth 15b of the mode switching gear 15. The mode switching gear 15 is rotated clockwise by the rotation of the motor M. Then, the second switching cam 26 is removed from the bent piece 20a of the head base 20, the head base 20 is returned by the tension of the spring 21 in the direction B, and the magnetic head H is separated from the tape T (FIG. 14). Then, when the motor M is again driven counterclockwise and the driving gear 9 is rotated counterclockwise, the planetary gear 12 disposed as designated by the broken line in FIG. 14 is circulated counterclockwise to arrive at the position to be engaged with the reel gear 5. The rotary force of the motor M is transmitted by the driving gear 9 through the planetary gear 12 to the reel gear 5, and the supply reel spool 3 is driven counterclockwise together with the reel gear 5. Then, the supply tape reel Rb in the cassette is rotated counterclockwise, and the tape is rewound. The rotating speed of the motor M at this time is high, and the tape T is rewound at a high speed.

Third Embodiment

Figure 15:
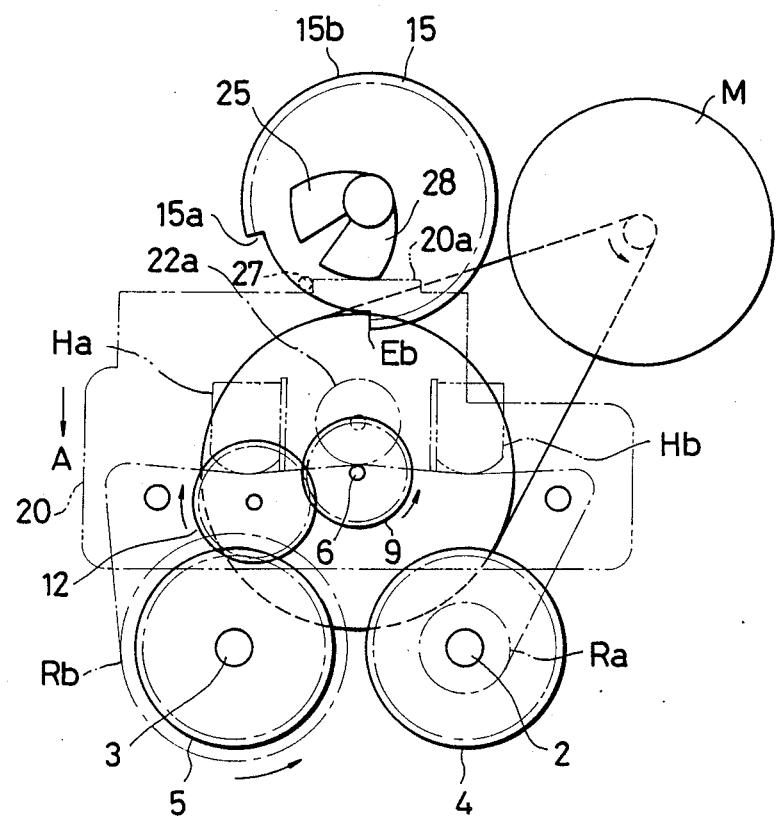
FIG. 15 is a view showing a driving mechanism of a tape player according to third embodiment of this invention.

Then, a third embodiment of this invention will be described with reference to FIG. 15. FIG. 15 shows a tape player of third embodiment is set in a reverse play mode.

In the third embodiment, the shape of the second switching cam is different from that of the second embodiment described above. In the third embodiment, the second switching cam 28 and the first switching cam 25 are disposed substantially in a symmetrical shape in such a manner that the rotating radius of the second switching cam 28 is the same as that of the first switching cam 25. In the third embodiment, two magnetic heads Ha and Hb are placed on the head base 20. The two magnetic heads Ha and Hb are disposed to be symmetrical with respect to the capstan 6. One magnetic head Ha is for normal playing, and the other magnetic head Hb is for reverse playing. The heads Ha and Hb respectively have combinations of recording/reproducing head and an erasure head. The recording/reproducing head and the erasure head may be integrated, or bonded. The pinch roller 22a provided on the head base 20 is so disposed as to be opposed on the same axis with respect to the capstan 6.

In the third embodiment, a stop mode, a play mode, an FF mode and an REW mode are set in the same operations as those of the second embodiment. More particularly, the first switching cam 25 presses the head base 20 in the direction A when the same switching operation as the state in FIG. 11 is performed in the second embodiment, the heads Ha and Hb are contacted with the tape, the tape reel Ra is driven by the takeup reel spool 2, and the tape is fed rightward in FIG. 15. At this time, recording or reproducing is performed by the magnetic head Ha for normal playing.

The reverse play mode as shown in FIG. 15 is set by switching in the same manner as the review mode in FIG. 13 in the second embodiment. More specifically, when the mode switching gear 15 is driven counterclockwise by the planetary gear 12, the head base 20 is pushed in the direction A by the second switching cam 28. In the second embodiment, the rotating radius of the second switching cam 26 is smaller, and the review mode is set as shown in FIG. 13. However, in the third embodiment, the second switching cam 28 has the same rotating radius as that of the first switching cam 25. Accordingly, the head base 20 is moved forward largely in the direction A, both the magnetic heads Ha and Hb are contacted with the tape T, and the pinch roller 22a is contacted under pressure with the capstan 6. At this time, the supply reel spool 3 is driven counterclockwise by the motor M at a low speed, and the tape T is fed by the capstan 6 rotating counterclockwise leftward of FIG. 15. Then, recording or reproducing is performed by the magnetic head Hb for reverse playing.

In the third embodiment in FIG. 15, the stopper 27 provided at the mode switching gear 15 is engaged with the left edge of the bent piece 20a of the head base 20 in the play mode and the reverse mode to stop rotating of the mode switching gear 15.

The switching to the other modes is performed in the same manner as the second embodiment.

According to the present invention as described above, the reel spool and the mode switching gear are driven by the planetary gear circulating around the driving gear. Therefore, not only a pair of reel spools but also the magnetic head as well as the head base having the pinch roller can be driven by rotating the capstan and the driving gear by one motor. More specifically, only one motor is sufficient as a power source, a solenoid can be eliminated to provide a simple tape player reduced in size inexpensively.

In the second aspect as claimed in claim 2, the second switching cam having a radius smaller than that of the first switching cam is provided. Therefore, the review mode can be set.

In the third aspect as claimed in claim 3, the second switching cam having the same radius as that of the first switching cam is provided. Accordingly, the reverse play mode can be set.

In the fourth aspect as claimed in claim 4, the mode switching gear is positioned to circulate the planetary gear in the play mode. Thus, the planetary gear is positively engaged with the mode gear.

What is claimed is:

1. A tape player comprising
a capstan rotatably driven by a motor and a driving gear rotated integrally with the capstan,
a planetary gear circulating around the driving gear in response to the rotating direction of the driving gear always in engagement with the driving gear,
a pair of reel gears, one of the reel gears disposed at a position to be engaged with the planetary gear circulated in one direction of the driving gear, the other of the reel gears disposed at a position to be engaged with the planetary gear circulated in the reverse rotation of the driving gear and a pair of reel spools rotated by the reel gears,
a mode switching gear disposed to be engaged with the planetary gear on a circulating trace moving from a position where the planetary gear is engaged with one of the reel gears to a position where the planetary gear is engaged with the other of the reel gears and partly formed with teeth to be rotated at a predetermined angle by the planetary gear,
a switching cm rotated together with the mode switching gear, and
a head base pressed by said switching cam while the mode switching gear is rotated by the planetary gear to be moved toward the reel spool and having a pinch roller opposed to the capstan and having a magnetic head.

2. A tape player according to claim 1, wherein said switching cam comprises a first switching cam disposed coaxially with the mode switching gear to press the head base while the mode switching gear is rotated by the planetary gear in one direction to contact the pinch roller under pressure with the capstan for setting a play mode, and a second switching cam formed with a smaller rotating radius than the first switching cam to press the head base while the mode switching gear is rotated reversely to the switching to the play mode by the planetary gear to lightly contact the magnetic head with the magnetic tape in the state that the pinch roller is separated from the capstan for setting a review mode.

3. A tape player according to claim 2, wherein a stopper for restricting the rotation of the mode switching gear in engagement with the head base is provided at the mode switching gear when one direction driving of the mode switching gear is completed by the planetary gear, the first switching cam is completely pressed to the head base, and when the reverse driving of the mode switching gear by the planetary gear is completed and the second switching cam is completely pressed to the head base.

4. A tape player according to claim 1, wherein said switching cam comprises a first switching cam disposed coaxially with the mode switching gear to press the head base while the mode switching gear is rotated by the planetary gear in one direction to contact the pinch roller under pressure with the capstan for setting a play mode, and a second switching cam formed with the same rotating radius as the first switching cam to press the head base by the second switching cam while the mode switching gear is rotated reversely to the switching to the play mode by the planetary gear to press the pinch roller to the capstan and to contact the magnetic head with the magnetic tape for setting a reverse replay mode.

5. A tape player according to claim 4, wherein a stopper for restricting the rotation of the mode switching gear in engagement with the head base is provided at the mode switching gear when one direction driving of the mode switching gear is completed by the planetary gear, the first switching cam is completely pressed to the head base, and when the reverse driving of the mode switching gear by the planetary gear is completed and the second switching cam is completely pressed to the head base.

* * * * *

UNITED STATES PATENT AND TRADEMARK OFFICE
CERTIFICATE OF CORRECTION

PATENT NO. : 4,922,357
DATED : May 1, 1990
INVENTOR(S) : Norimasa Komatsu

It is certified that error appears in the above-identified patent and that said Letters Patent is hereby corrected as shown below:

Title should read:
--Single-Motor Mode Changing Mechanism In Tape Player--

Col. 13, Line 42 (Claim 1), change "cm" to --cam--

Signed and Sealed this

Third Day of September, 1991

Attest:

HARRY F. MANBECK, JR.

Attesting Officer

Commissioner of Patents and Trademarks